(12) United States Patent
Bruder et al.

(10) Patent No.: US 8,615,459 B2
(45) Date of Patent: Dec. 24, 2013

(54) FLEXIBLE ALLOCATION PROCESS

(75) Inventors: Benjamin Bruder, Charenton le Pont (FR); Nicolas Gaussel, Paris (FR); Guillaume Lasserre, Paris (FR)

(73) Assignee: Lyxor Asset Management, Puteaux (FR)

( * ) Notice: Subject to any disclaimer, the term of this patent is extended or adjusted under 35 U.S.C. 154(b) by 13 days.

(21) Appl. No.: 13/241,718

(22) Filed: Sep. 23, 2011

(65) Prior Publication Data

US 2012/0136805 A1 May 31, 2012

Related U.S. Application Data

(60) Provisional application No. 61/417,585, filed on Nov. 29, 2010.

(51) Int. Cl.
*G06Q 40/00* (2012.01)
(52) U.S. Cl.
USPC .......................................................... 705/36

(58) Field of Classification Search
USPC ...................................................... 705/38, 36
See application file for complete search history.

(56) References Cited

U.S. PATENT DOCUMENTS 6,282,520 B1 * 8/2001 Schirripa ..................... 705/36 R
7,685,056 B2 * 3/2010 Menon ............................ 705/37

* cited by examiner

*Primary Examiner* — Clifford Madamba
(74) *Attorney, Agent, or Firm* — Dowell & Dowell, P.C.

(57) ABSTRACT

A method of managing an open ended fund of a client including determining a random maturity and a payoff function of the fund, calculating a profile of the payoff function depending on a current price of a risky asset of the fund, calculating, according to the profile, an exposure function depending on the current price of the risky asset, estimating an average reference price of the risky asset, and computing a current target exposure of the fund to the risky asset, according to the exposure function and the price and the average reference price of the risky asset.

11 Claims, 6 Drawing Sheets

FLEXIBLE ALLOCATION PROCESS

TECHNICAL FIELD

The invention relates to a method of managing an open ended fund, the fund being adapted to be subscribed by a client between whatever entry date and whatever exit date. The fund is subscribed at a respective entry price by each client, and comprises a plurality of underlying financial assets.

BACKGROUND OF THE INVENTION

Traditional Strategies

"Traditional" fund management consisted mostly in buying or selling some specific security in the market and putting (borrowing) some money in (from) a bank account at a given time and holding it during a long period, typically years. This technique is sometimes referred to as "buy and hold" technique since it merely consists in buying and holding some predefined security during a certain time.
As a result, the value at the end of the investment period T of a fund managed thanks to a "Buy and Hold strategy" can be represented as an affine function of the value of the underlying security at the same date. Portfolio 1 in FIG. 1 is the graphical representation of a strategy consisting in borrowing $ K2 from a bank and buying α1% of the fund value of S&P 500. On another hand, Portfolio 2 displayed in FIG. 1 is the graphical representation of a strategy consisting in putting $ K2 in a bank account and of selling α2% of the fund value of S&P 500.

The final value of such strategies is sometimes referred as its "payoff". The set of payoff of Buy and Hold strategies is all possible affine functions.

Modern Strategies

In between 1970 and 1990, path breaking works in financial theory documented properly the fact that moving from Buy and Hold strategies to continuous trading could generate a much wider variety of "payoffs". More specifically, thanks to continuous trading between two dates, it has been shown that it was possible for a Mutual fund to provide to investors such wide range of payoff. The more famous payoffs are displayed in FIG. 2. Most distinguished contributors of such "discovery", professors Black, Merton and Scholes were awarded the Nobel Prize in 1997 "for a new method to determine the value of derivatives".

It can be shown that combining above "payoffs" can lead to portfolios with a terminal value that can be whatever function of the terminal value of a specified underlying security.

The problem with this approach is that such payoff can be obtained only if a specified investor starts the strategy at a precise point in time $t_0$ and stops trading at a specified point in time $t_0+T$, as shown in FIG. 3 where the entry point and the redemption point are fixed points. In other words, it means that, a fund manager cannot pull different investors interests and has to launch different funds depending on when investors are ready to invest their money.

Therefore, the purpose of the invention is to find a fund trading mechanism that could open the possibility to pool different investor's interests at different point in times. In other words, the purpose of the invention is to create a trading automat that could perform this operation in between whatever entry date t and exit date t+T as shown in FIG. 4, thereby allowing fund managers to deliver a specified payoff between different dates instead of launching as many different funds as would be needed.

SUMMARY OF THE INVENTION

To this end, the invention relates to a method of managing an open ended fund, the fund being adapted to be subscribed by a client on whatever entry date $t_{in}$ at an entry price and to be redeemed by the client on whatever exit date $t_{in}+T$, the fund comprising an underlying risky financial asset and a non-risky financial asset, the method comprising the steps of:
- determining a random maturity of the fund according to a statistical law, the maturity representing the duration between current date and an exit date,
- determining a payoff function of the fund, the payoff representing the performance to be attained by the fund at the maturity, and
- calculating a profile of the payoff function, depending on the current price of the underlying risky asset, the profile being an objective to be replicated by the fund according to the random maturity,
- calculating, according to the profile, an exposure function depending on the current price of the underlying risky asset, wherein the exposure function represents the percentage of the underlying risky asset in the fund,
- estimating, at time t, an average reference price of the underlying risky asset for the plurality of entry prices, and
- computing, at time t, the current target exposure of the fund to the underlying risky asset, according to the exposure function, the price of the underlying risky asset and the average reference price of the underlying risky asset.

According to other embodiments, the method of managing an open ended fund comprises one or more of the following features, taken alone or in any technically possible combination:
- the fund consists of an underlying risky financial asset and a non-risky financial asset, each financial asset comprising a plurality of securities in varying proportions,
- the maturity is distributed through an exponential law:

$$Pr(\tau \geq t) = \exp\left(-\frac{t-t_0}{\lambda}\right),$$

wherein $\tau$ represents the maturity, $t_0$ represents the current day and $\lambda$ represents the average time to investment horizon of the investors, the payoff function $$\left(f\left(\frac{S_\tau}{K}\right)\right)$$

is given by:

$$f\left(\frac{S_\tau}{K}\right) = \frac{S_\tau}{K} - \alpha \cdot \text{Max}\left(\frac{S_\tau}{K} - 1; 0\right) + \beta \cdot \text{Max}\left(1 - \frac{S_\tau}{K}; 0\right)$$

wherein $S_\tau$ represents the price of the underlying risky asset at the maturity $\tau$, K represents the entry price of the underlying risky asset, $\alpha$ represents an abandon percentage of the potential gains, and $\beta$ represents a protection percentage of the potential loss, the unitary profile of the payoff function is the unique solution of the ordinary differential equation:

$$(r + 1/\lambda)P(s) - (r-d)sP'(s) - \frac{1}{2}s^2\sigma^2 P''(s) = f(s/K)$$

wherein r represents a risk free rate, λ represents the average time to investment horizon of the investors, σ represents a volatility value, and d represents the future dividend rate of the risky asset, if such a dividend is expected, the volatility value at time t is given by:

$$\sigma_t^2 = \beta \sigma_{t-1}^2 + (1-\beta)\left(\frac{S_t - S_{t-1}}{S_{t-1}}\right)^2$$

wherein β is a fixed parameter chosen for the fund, the value of β being between 0 and 1, $S_t$ is the price of the underlying at the calculation date, $S_{t-1}$ is the price of the underlying at the previous calculation date, and the initial value $\sigma_0$ of the volatility is fixed during the creation of the fund, the exposure function is given by:

$$e(s) = \frac{s \frac{\partial P(s)}{\partial s}}{P(s)},$$

wherein P(s) is the profile of the payoff function, depending on the price s of the underlying risky asset, the average reference price of the underlying risky asset is estimated according to a discrete iteration given by:

$$K_t = \left(1 - \frac{1}{\mu}\right)K_{t-\delta t} + \frac{1}{\mu}S_t \text{ and } K_{t_{init}} = S_{t_{init}},$$

wherein t-δt is the last reference price calculation date, t is the current reference price calculation date, μ is a fixed parameter chosen individually for the fund, and $St_{init}$ represents the price of the underlying risky asset at some given date $t_{init}$, and the method is a computer implemented method.

The invention also relates to a computer program product residing on a computer readable medium and comprising computer program means for running on a computer a method as defined above.

BRIEF DESCRIPTION OF THE DRAWINGS

Embodiments of the invention are illustrated in the figures. However, as examples of the invention, the embodiments and figures are illustrative rather than limiting.

DETAILED DESCRIPTION OF PREFERRED EMBODIMENTS

Figure 1:
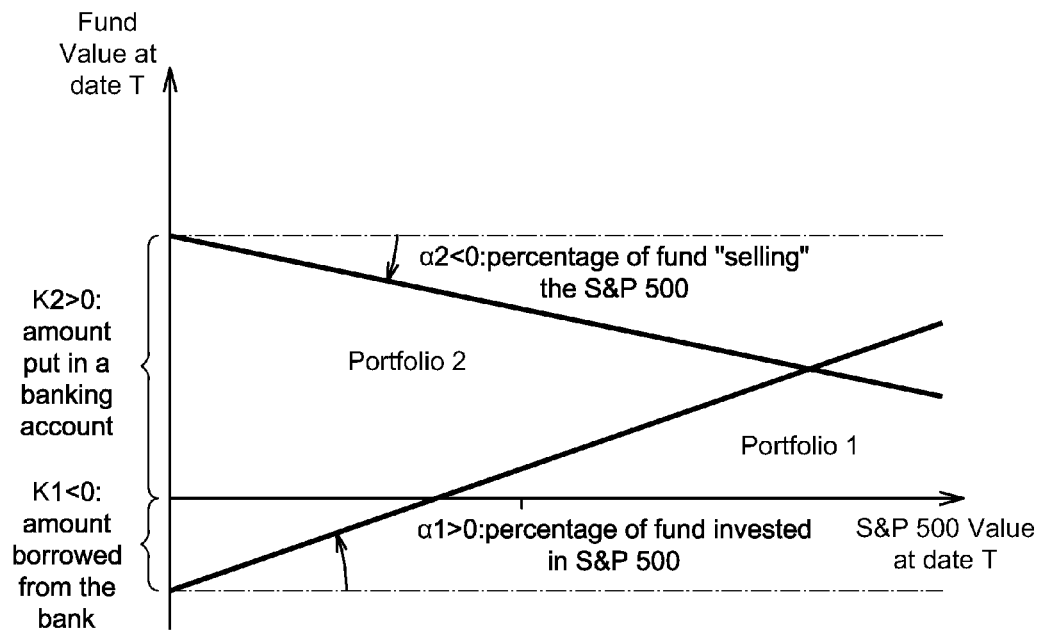
FIGS. 1 and 2 illustrate prior art fund management methods.
Figure 2:
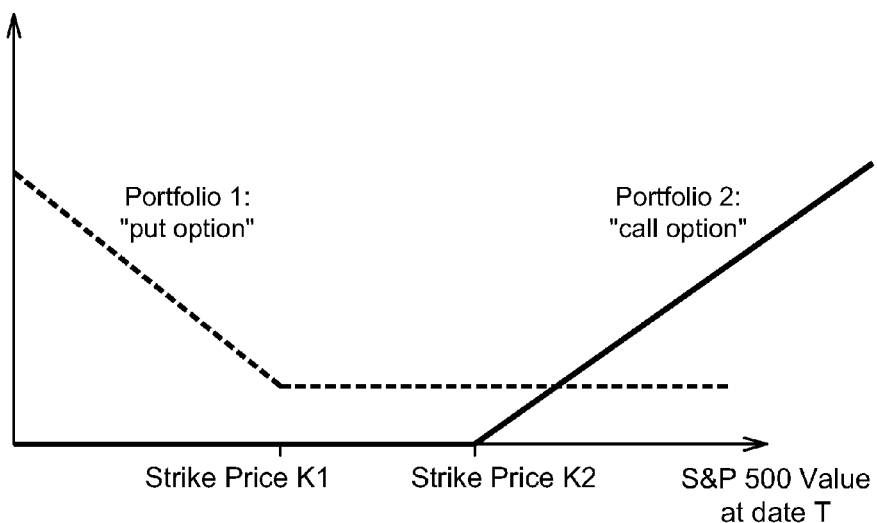
Figure 3:
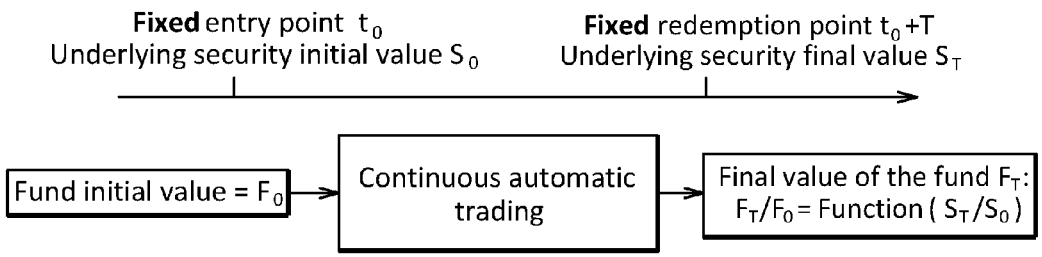
FIG. 3 illustrates prior art fund trading mechanism.
Figure 4:
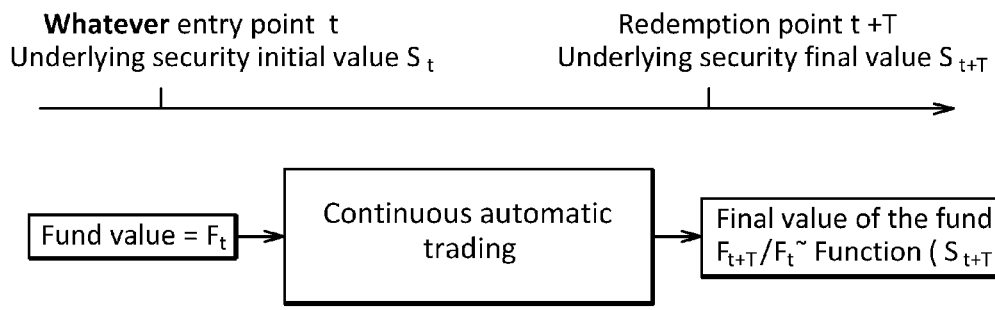
FIG. 4 illustrates a fund trading mechanism according to the invention.
Figure 5:
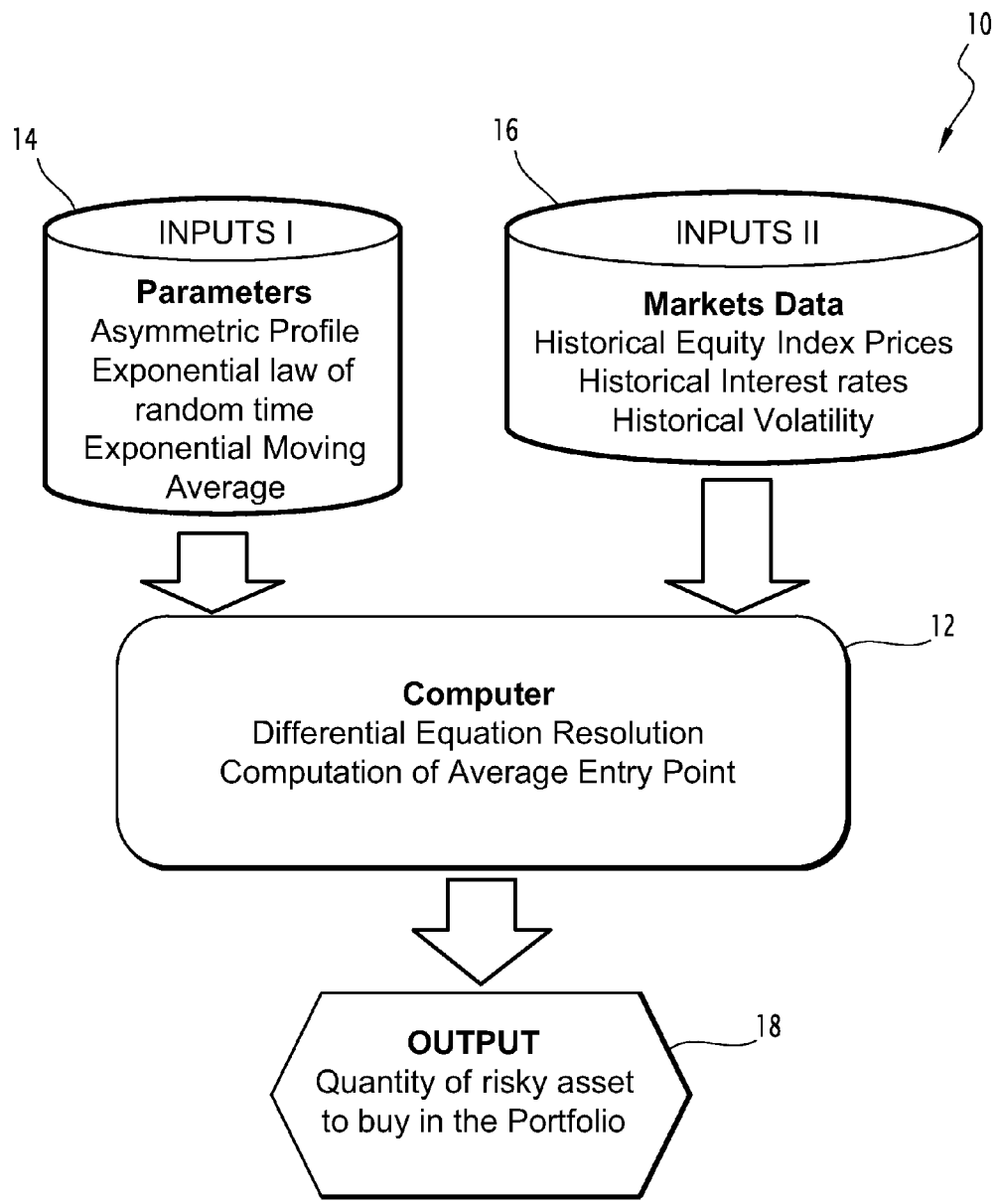
FIG. 5 illustrates a computer system for implementing a method of managing an open ended fund according to the invention, the fund comprising a plurality of underlying financial assets.

FIG. 5 illustrates a computer system 10 for implementing a method of managing an open ended fund, the fund being adapted to be subscribed by a client on whatever entry date $t_{in}$ at an entry price and to be sold by the client on whatever exit date $t_{in}$+T. The fund comprises an underlying risky financial asset and some non-risky financial assets.

The computer system 10 comprises a computer 12, a first database 14 and a second database 16, the first and second databases 14, 16 being connected to the computer 12.

The computer 12 comprises a processor and a memory adapted to store softwares.

The first database 14 comprises a memory for storing predetermined parameters of the managing method. The predetermined parameters comprise, for example, a statistical law, such as an exponential law, for determining the random maturity τ of the fund, the maturity τ representing the duration between current date and an exit date. The predetermined parameters comprise, for example, a payoff function $f(S_\tau/K)$ of the open ended fund, also called asymmetric profile, the payoff representing the performance to be attained by the fund at the maturity τ, and an exponential moving average Kt, also called average reference price, and modeling the average entry point (or reference price) of investors in the fund.

The second database 16 comprises a memory for storing markets data, which are input data of the managing method. The markets data comprise, for example, historical equity index prices, historical interest rates and historical volatility.

The memory of the computer 12 is adapted to store a software for determining a random maturity τ of the fund according to the statistical law stored in the first database 14, a software for resolving a differential equation in order to calculate a profile P(s) of the payoff function stored in the first database 14. The memory is adapted to store a software for calculating, according to the profile P(s), an exposure function e(s) depending on the current price s of the underlying risky asset according to the markets data stored in the second database 16, the target exposure function e(s) representing the percentage of the underlying risky asset to be held in the fund. The memory is adapted to store a software for computing at time t the average entry point $K_t$ of the underlying risky asset for the plurality of entry prices, also called average reference price, and a software for computing, at time t, the target exposure $e_t$ of the fund to the underlying risky asset, according to the exposure function e(s), the price $S_t$ of the underlying risky asset and the average reference price $K_t$.

The computer 12 is then adapted to deliver an output file 18 comprising the quantity of risky asset to buy in the fund, also called portfolio, as a result of the implementation of the method of managing the open ended fund.

Figure 6:
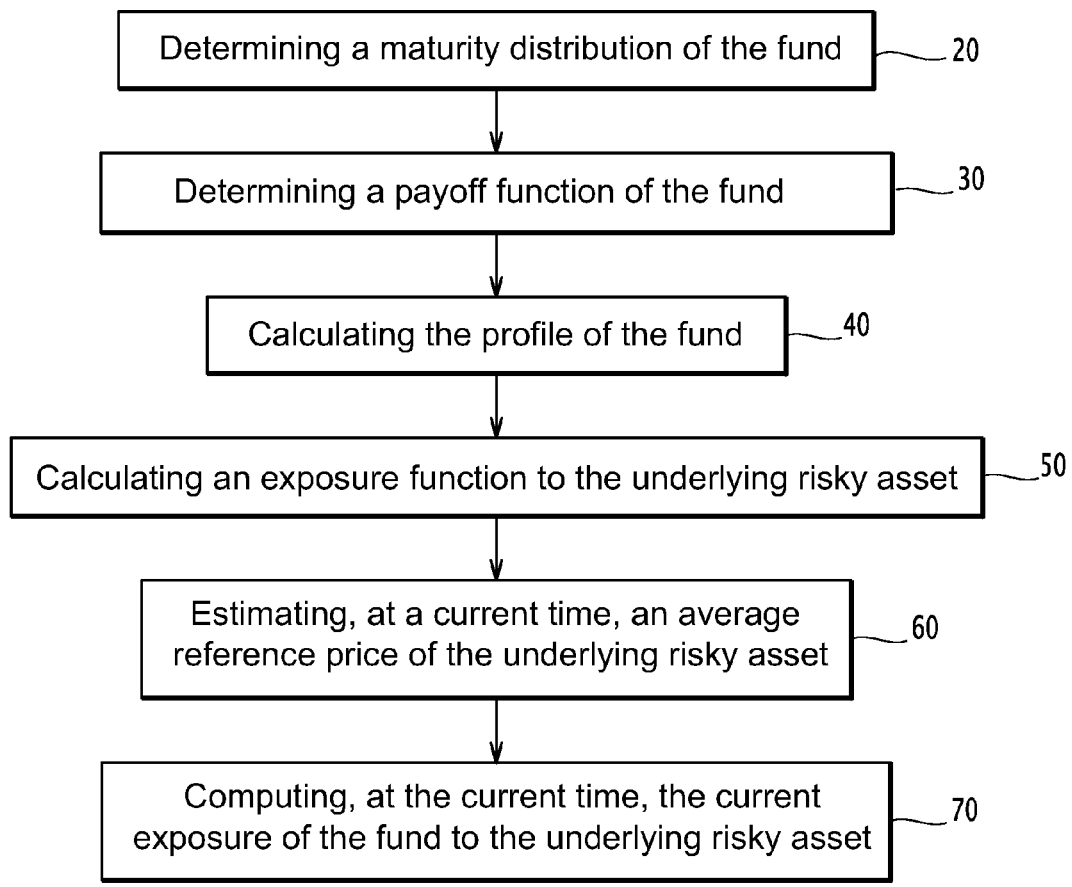
FIG. 6 illustrates a flow chart of the method of managing an open ended fund according to the invention.

FIG. 6 illustrates a flow chart of the fund managing method.

For the profile P the managing method for managing the open ended fund comprises a step 20 of determining the random maturity τ of the fund according to the statistical law stored in the first database 14. Indeed, the redemption time is different for every investor, and is not known by the fund manager. A solution is to consider that the maturity of the fund is a random time distributed through a statistical law, for example an exponential law given by:

$$Pr(\tau \geq t) = \exp\left(-\frac{t-t_0}{\lambda}\right) \quad \text{(I)}$$

wherein $\tau$ represents the maturity, $t_0$ represents the current day and $\lambda$ represents the average time to investment horizon of the investors.

The average value of the maturity $\tau$ is equal to $\lambda$, for example equal to 3 months if $\lambda$ is equal to 0.25.

The managing method then comprises a step 30 of determining the payoff function $f(S_\tau/K)$ of the fund for the maturity $\tau$.

This payoff represents the performance of the fund to be attained in the future at the random time $\tau$. Denoting the net asset value of the fund at time t as Ft, the objective is to obtain at time $\tau$:

$$F_\tau = F_0 f\left(\frac{S_\tau}{K}\right) \quad \text{(II)}$$

For example, the payoff function $f(S_\tau/K)$ is given by:

$$f\left(\frac{S_\tau}{K}\right) = \frac{S_\tau}{K} - \alpha \cdot \text{Max}\left(\frac{S_\tau}{K} - 1; 0\right) + \beta \cdot \text{Max}\left(1 - \frac{S_\tau}{K}; 0\right) \quad \text{(III)}$$

wherein $S_\tau$ represents the price of the underlying risky asset at the maturity $\tau$, K represents the entry price of the underlying risky asset, $\alpha$ represents an abandon percentage of the potential gains, and $\beta$ represents a protection percentage against potential loss.

Figure 7:
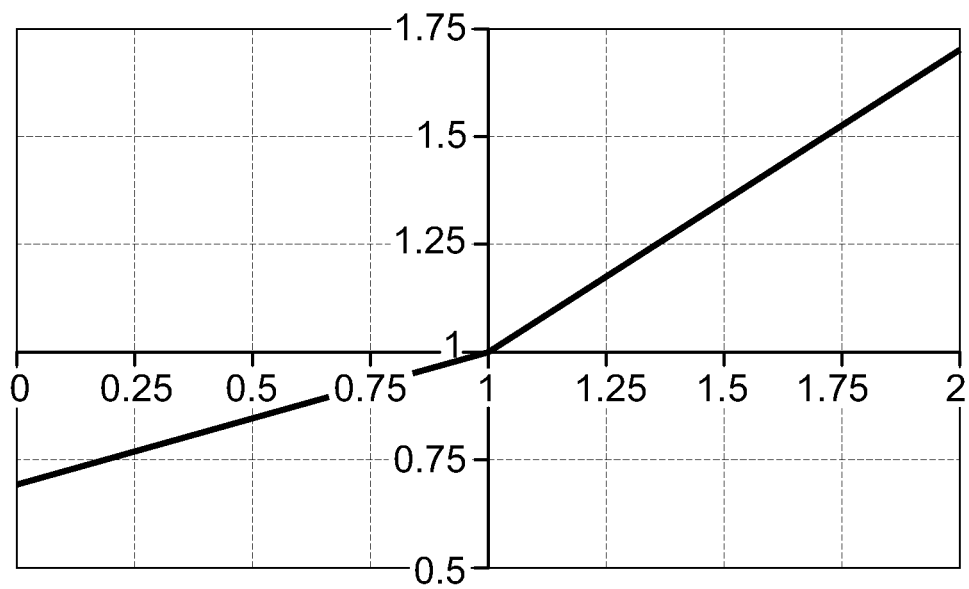
FIG. 7 illustrates a payoff function of the open ended fund.

FIG. 7 illustrates the payoff function of equation (III) with a equal to 0.3, $\beta$ equal to 0.7, and K equal to 1€. The X axis, also called abscissa axis, represents the value of the underlying risky asset at time $\tau$, while the Y axis, also called ordinate axis, represents the objective of the fund (supposing that the objective at time 0 is equal to 1€).

It can be read as follows. It is supposed that the client invests 1€ into the EUROSTOXX 50 at price K at time 0 (today). Then, at time $\tau$ the value of his investment will be $S_\tau/K$.

If the price of the EUROSTOXX 50 decreases between time 0 and $\tau$, then his loss will be equal to $1-S_\tau/K$. The objective is to protect against $\beta$ % of this potential loss, and therefore the term $$\beta \cdot \text{Max}\left(1 - \frac{S_\tau}{K}; 0\right)$$

is added. It should be noted that this term is only triggered if there is effectively some loss, that is if $S_\tau/K<1$.

On the other hand, to get a more attainable objective, it is admitted to abandon $\alpha$ % of the potential gains from EUROSTOXX 50. This is why the term $$\alpha \cdot \text{Max}\left(\frac{S_\tau}{K} - 1; 0\right)$$

is subtracted. This term is only triggered if there is effectively some gains, that is if $S_\tau/K>1$.

These objectives for different maturities need to be aggregated into a profile. It is necessary at step 40 to compute the profile P(s) to be replicated today (at time 0), also called the "mutualized objective". Using the option replication theory, this profile can be written as:

$$P(s) = E\left(\exp(-r\tau)f\left(\frac{S_\tau}{K}\right) \bigg| S_0 = s\right) \quad \text{(IV)}$$

wherein r denotes the risk free rate and E denotes the expectation under the risk neutral probability. This risk neutral probability depends on the option pricing model and the distribution of random maturities $\tau$. The riskless interest can be extracted every day from market data, using for example the Euribor 3 month rate. The pricing model is typically a Black-Scholes model. Nonetheless, the Black Scholes pricing volatility a evolves every day, based on a calculation method detailed hereafter.

The profile P(s) of the payoff function is the unique solution of the ordinary differential equation:

$$(r + 1/\lambda)P(s) - (r-d)sP'(s) - \frac{1}{2}\sigma^2 s^2 P''(s) = f(s/K) \quad \text{(V)}$$

wherein r represents a risk free rate, $\lambda$ represents the average investment horizon, $\sigma$ represents a volatility value, and d represents a future dividend rate of the risky asset, if such a dividend is expected.

Figure 8:
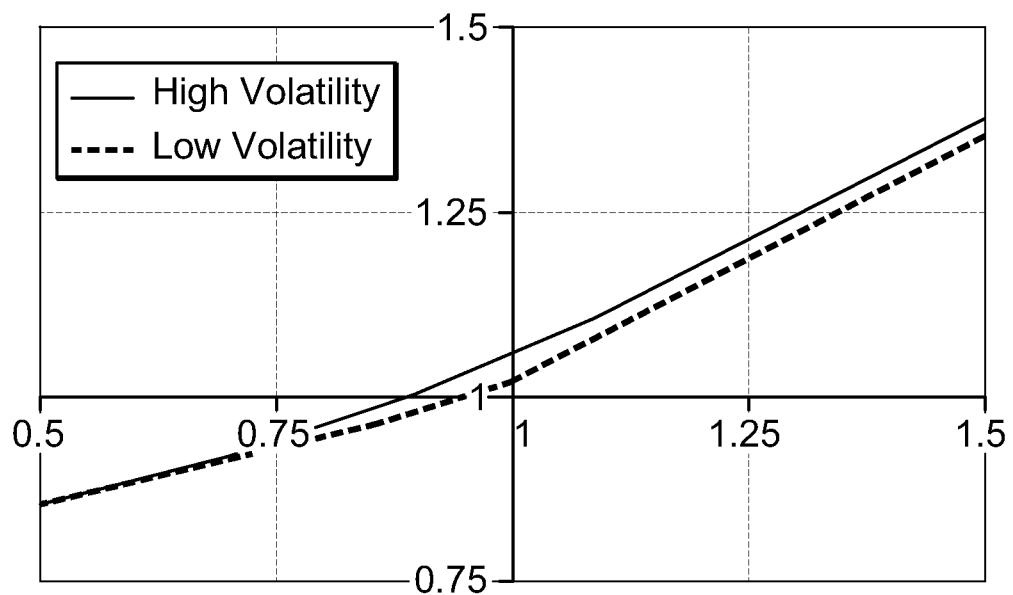
FIG. 8 illustrates a global profile of the payoff function according to two different volatility values.

FIG. 8 illustrates the profile P(s) according to equations (III) and (V) with a equal to 0.3, $\beta$ equal to 0.7, and K equal to 1€, for two different values of the volatility $\sigma$. The X axis represents the value of the underlying risky asset at time $\tau$, while the Y axis represents the objective of the fund that is needed today to attain the future objective.

The exposure function e(s) is calculated at step 50. From the option pricing theory the quantity of underlying risky asset to hold in order to replicate the payoff, denoted as $\Delta$ is given by:

$$\Delta(s) = \frac{\partial P}{\partial s}(s) \quad \text{(VI)}$$

The exposure of the fund to an asset is defined as the amount of money invested in this asset, expressed as a percentage of total portfolio holdings. The fund manager will buy or sell the underlying risky asset to match the target exposure. The target exposure function e(s) of the fund to its underlying, which is the quantity implemented in practice by the fund manager is given by:

$$e(s) = \frac{s\frac{\partial P(s)}{\partial s}}{P(s)} \quad \text{(VII)}$$

with P(s) the profile of the payoff function, depending on the price s of the underlying risky asset.

Figure 9:
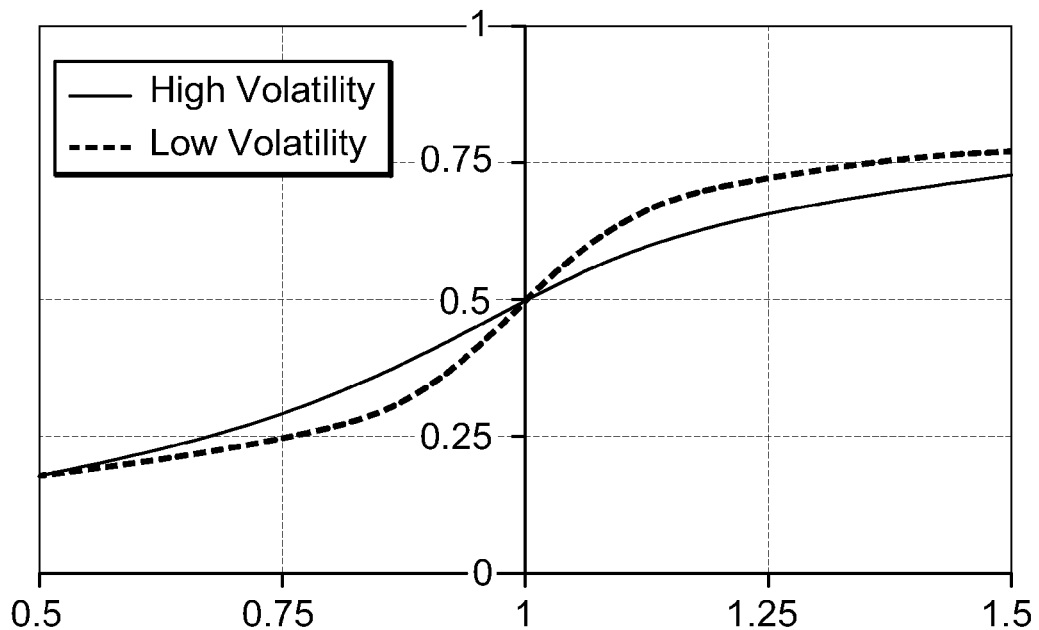
FIG. 9 illustrates an exposure function representing the percentage of the underlying risky asset in the fund.

FIG. 9 illustrates the exposure function e(s) of the fund for two different values of the volatility $\sigma$. The X axis represents the ratio S/K between the current price and the entry price of the underlying risky asset, while the Y axis represents the exposure of the fund to the underlying risky asset, as a percentage between 0% and 100%, i.e. between 0 and 1.

The pricing volatility used in equation (V) evolves dynamically due to the evolution of market prices. In some cases, implicit volatilities of the underlying risky asset can be observed in the market, reflecting the market price of derivative contracts. For example, the VSTOXX index represents an average pricing volatility of the EUROSTOXX 50 index listed options. Therefore, if the underlying of the fund is the EUROSTOXX 50, we would use every day the current VSTOXX index as a pricing volatility in equation (V).

If such a volatility index does not exist for the underlying, the historical volatility is estimated based on past prices of the underlying risky asset, for example by using the IGARCH volatility estimator formula, that is:

$$\sigma_t^2 = \beta \sigma_{t-1}^2 + (1-\beta)\left(\frac{S_t - S_{t-1}}{S_{t-1}}\right)^2 \quad \text{(VIII)}$$

wherein β is a fixed parameter chosen for the fund, the value of β being between 0 and 1, $S_t$ is the price of the underlying at the calculation date, $S_{t-1}$ is the price of the underlying at the previous calculation date, $\sigma_{t-1}$ is the pricing volatility at the previous calculation date, and the initial value $\sigma_0$ of the volatility is fixed during the creation of the fund. Naturally, the current pricing volatility $\sigma_t$ is obtained by:

$$\sigma_t = \sqrt{\sigma_t^2} \quad \text{(IX)}$$

As the fund is open ended, client may subscribe in the fund at various dates. Suppose that each client considers the reference price of the underlying as the price at their own investment date into the fund. As such, the reference price of the underlying is not the same for each investor.

Thus, the method comprises a step 60 of estimating, at time t, an average reference price $K_t$ of the underlying risky asset for the plurality of entry prices.

It is, for example, supposed that the clients subscribe in the fund following an exponential density. In this case, the average reference price $K_t$ could be written as:

$$K_t^{theorical} = \mu \int_{-\infty}^{t} e^{-\frac{(u-t)}{\mu}} S_u \, du \quad \text{(X)}$$

wherein μ is a fixed parameter chosen individually for the fund.

Of course, such a computation is impossible in practice, as this is a continuous sum which involves an infinite history of prices for the underlying. Therefore, average reference price $K_t$ is calculated using the following discrete iterative counterpart:

$$K_t = \left(1 - \frac{1}{\mu}\right) K_{t-\delta} + \frac{1}{\mu} S_t \quad \text{(XI)}$$

wherein t-δt is the last reference price calculation date, and t is the current reference price calculation date. This reference price is, for example, calculated for every business day, at a specific time (e.g. 17.30 pm). Therefore δt is the time interval between two business days, and the price of the underlying will always be considered at the same time of the day.

This recursive procedure must be initialized. To this end, the initial reference price is chosen to be the price of the underlying at a given date $t_{init}$:

$$K_{t_{init}} = S_{t_{init}} \quad \text{(XII)}$$

The initialization date can be chosen to be several years before the launch date of the fund, and the recursive relation is then calculated with historical data.

The method finally comprises a step 70 of computing, at time t, the current target exposure $e_t$ of the fund to the underlying risky asset, according to the exposure function e(s), the price $S_t$ of the underlying risky asset and the average reference price $K_t$ of the underlying risky asset.

Figure 10:
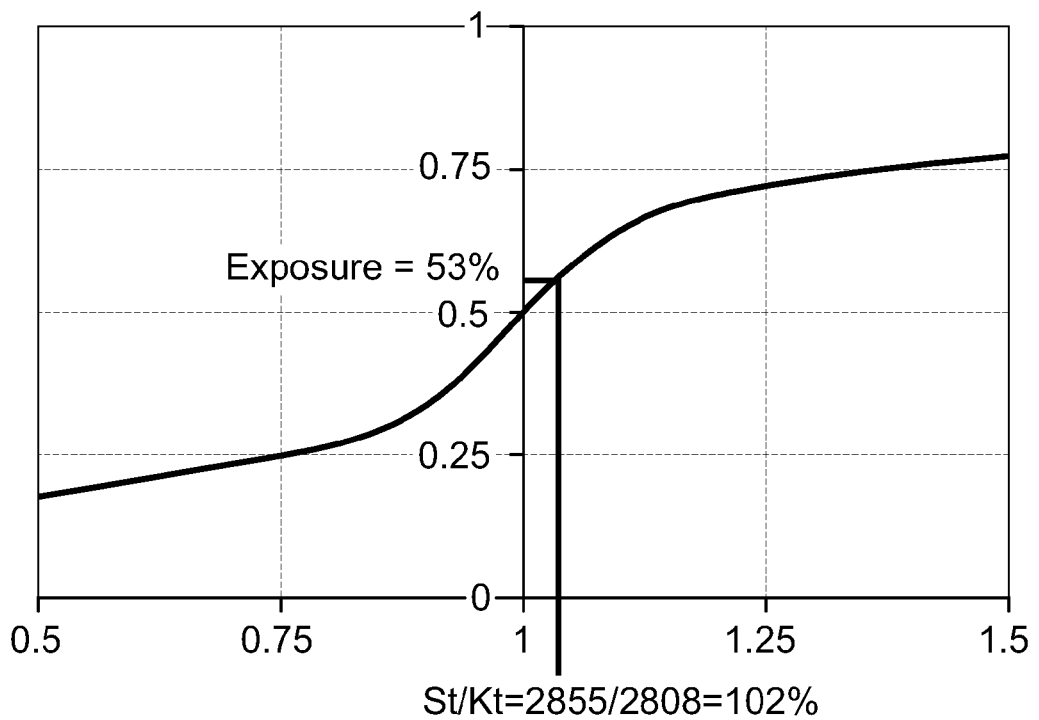
FIG. 10 illustrates the computing of a current exposure of the fund to the underlying risky asset.

FIG. 10 illustrates an example of this computation, wherein it is first determined that the ratio $S_t/K_t$ is equal to 102%, and it is then computed that the current exposure $e_t$ is equal to 0.53, that is 53%, according to the exposure function e(s) represented by the curve.

As an example of the aforementioned method, a fund is implemented on European equities and European Bonds which will invest in EUROSTOXX 50 futures and BOBL futures and cash.

S will refer to the level of the EUROSTOXX 50, which was 2739.37 of Nov. 23, 2010. The payoff, or asymmetric objective, will be to benefit after one year of 70% of the increase of the EUROSTOXX 50 and 30% of the decrease of the EUROSTOXX 50. Thus, the maturity T is equal to one year, and the function f is given by:

$$f\left(\frac{S}{K}\right) = \frac{S}{K} - 0.3 \cdot \text{Max}\left(\frac{S}{K} - 1; 0\right) + 0.7 \cdot \text{Max}\left(1 - \frac{S}{K}; 0\right) \quad \text{(XIII)}$$

For the exponential law, the parameter λ is chosen equal to 0.25, that is a 3 month average time to maturity.

Using market data on volatility, for example historical values of VSTOXX divided by 100 (Bloomberg code V2X Index), the current value of the volatility variable was 27.629% as of Nov. 23, 2010.

Once the exposure function is calculated as aforementioned, the correct point on the X-axis is searched in order to determine the right quantity to implement into the fund.

The next step is the calculation of the reference price as described above using the parameter μ and daily historical prices of the EUROSTOXX 50. If μ=140, $t_{init}$=Dec. 30, 2009 and EUROSTOXX 50 price on Dec. 30, 2009 is 2966.24, then K as of Nov. 23, 2010 has a value of 2807.44.

The equity exposure has to be e(2739.37/2807.44)=e (0.9756)=46% according to the exposure function illustrated in FIG. 10.

If the net asset value of the fund is 100 000 000 €, the target is to match an exposure on EUROSTOXX 50 futures contracts of 46%×100 000 000=46 000 000 €. The value of a contract is 27 520 € as of Nov. 23, 2010, hence the fund has to be invested in 1671 EUROSTOXX 50 futures contract. The quantity of contracts to buy or sell is the difference between 1671 and the existing number of contracts already held by the fund.

Thus, the method according to the invention provides a fund trading mechanism that opens the possibility to pool different investor's interests at different point in times. In other words, the fund managing method of the invention provides a trading automat that operate between whatever entry date t and exit date t+T, thereby allowing fund managers to deliver a specified payoff between different dates instead of launching as many different funds as would be needed according to prior art fund managing methods.

The invention claimed is:

1. A method of managing an open ended fund for use on a computer system including first and second databases connected to a computer having a processor and a memory, wherein the fund is subscribed by a client on an entry date ($t_{in}$) at an entry price and to be redeemed by the client on an exit date ($t_{in}+T$), and wherein the fund includes an underlying risky financial asset and a non-risky financial asset, the method comprising the steps of:

determining, by the processor, a random maturity ($\tau$) of the fund according to a statistical law, the random maturity ($\tau$) representing the duration between current date and an exit date, determining, by the processor, a payoff function $$\left( f\left(\frac{S_\tau}{K}\right) \right)$$

of the fund, the payoff representing the performance to be attained by the fund at the random maturity ($\tau$), and calculating, by the processor, a profile (P(s)) of the payoff function $$\left( f\left(\frac{S_\tau}{K}\right) \right),$$

depending on the current price (s) of the underlying risky asset, the profile (P(s)) being an objective to be replicated by the fund according to the random maturity ($\tau$), calculating, by the processor, an exposure function (e(s)) based on the profile (P(s)) of the payoff function and the current price (s) of the underlying risky asset, wherein the exposure function (e(s)) represents the percentage of the underlying risky asset in the fund, estimating, at time t, an average reference price ($K_t$) of the underlying risky asset for the plurality of entry prices, and computing, at time t, the current target exposure ($e_t$) of the fund to the underlying risky asset, based on the exposure function (e(s)), the price ($S_t$) of the underlying risky asset at time t and the average reference price ($K_t$) of the underlying risky asset.

2. The method of claim 1,
wherein the fund consists of an underlying risky financial asset and a non-risky financial asset, each financial asset comprising a plurality of securities in varying proportions.

3. The method of claim 1,
wherein the random maturity ($\tau$) is distributed through an exponential law:

$$Pr(\tau \geq t) = \exp\left(-\frac{t-t_0}{\lambda}\right),$$

wherein $\tau$ represents the random maturity, $t_0$ represents the current day and $\lambda$ represents the average time to investment horizon of the investors.

4. The method of claim 1,
wherein the payoff function $$\left( f\left(\frac{S_\tau}{K}\right) \right)$$

is given by:

$$f\left(\frac{S_\tau}{K}\right) = \frac{S_\tau}{K} - \alpha \cdot \text{Max}\left(\frac{S_\tau}{K} - 1; 0\right) + \beta \cdot \text{Max}\left(1 - \frac{S_\tau}{K}; 0\right)$$

wherein $S_\tau$ represents the price of the underlying risky asset at the random maturity $\tau$, K represents the entry price of the underlying risky asset, $\alpha$ represents an abandon percentage of the potential gains, and $\beta$ represents a protection percentage of the potential loss.

5. The method of claim 1,
wherein the profile (P(s)) of the payoff function is the unique solution of the ordinary differential equation:

$$(r + 1/\lambda)P(s) - (r-d)sP'(s) - \frac{1}{2}s^2\sigma^2 P''(s) = f(s/K)$$

wherein r represents a risk free rate, $\lambda$ represents the average time to investment horizon of the investors, $\sigma$ represents a volatility value, and d represents the future dividend rate of the risky asset, if such a dividend is expected.

6. The method of claim 5,
wherein the volatility value ($\sigma$) at time t is given by:

$$\sigma_t^2 = \beta\sigma_{t-1}^2 + (1-\beta)\left(\frac{S_t - S_{t-1}}{S_{t-1}}\right)^2$$

wherein $\beta$ is a fixed parameter chosen for the fund, the value of $\beta$ being between 0 and 1, $S_t$ is the price of the underlying risky asset at the calculation date at time t, $S_{t-1}$ is the price of the underlying at the previous calculation date, and the initial value $\sigma_0$ of the volatility is fixed during the creation of the fund.

7. The method of claim 1,
wherein the exposure function (e(s)) is given by:

$$e(s) = \frac{s\frac{\partial P(s)}{\partial s}}{P(s)},$$

wherein P(s) is the profile of the payoff function, depending on the price s of the underlying risky asset.

8. The method of claim 1,
wherein the average reference price ($K_t$) of the underlying risky asset is estimated according to a discrete iteration given by:

$$K_t = \left(1 - \frac{1}{\mu}\right)K_{t-\delta t} + \frac{1}{\mu}S_t \text{ and } K_{t_{init}} = S_{t_{init}},$$

wherein $t-\delta t$ is the last reference price calculation date, t is the current reference price calculation date, $\mu$ is a fixed parameter chosen individually for the fund, and $St_{init}$ represents the price of the underlying risky asset at some given date $t_{init}$.

9. The method of claim 1,
wherein the method is a computer implemented method.

10. The method of claim 9,
wherein the method further comprises a computer program product residing on a non-transitory computer readable medium and further comprising computer program means for running on a computer.

11. A computer program product residing on a non-transitory computer readable medium and having computer program means for running on a computer, such that when executed by a computer having a processor and a memory, the computer performs a method of managing an open ended fund, wherein the fund is subscribed by a client on an entry date ($t_{in}$) at an entry price and to be redeemed by the client on an exit date ($t_{in}+T$), and wherein the fund includes an underlying risky financial asset and a non-risky financial asset, the method comprising the steps of:

determining, by the processor, a random maturity ($\tau$) of the fund according to a statistical law, the random maturity ($\tau$) representing the duration between current date and an exit date, determining, by the processor, a payoff function $$\left(f\left(\frac{S_\tau}{K}\right)\right)$$

of the fund, the payoff representing the performance to be attained by the fund at the random maturity ($\tau$), and calculating, by the processor, a profile (P(s)) of the payoff function $$\left(f\left(\frac{S_\tau}{K}\right)\right),$$

depending on the current price (s) of the underlying risky asset, the profile (P(s)) being an objective to be replicated by the fund according to the random maturity ($\tau$), calculating, by the processor, an exposure function (e(s)) based on the profile (P(s)) of the payoff function and the current price (s) of the underlying risky asset, wherein the exposure function (e(s)) represents the percentage of the underlying risky asset in the fund, estimating, at time t, an average reference price ($K_t$) of the underlying risky asset for the plurality of entry prices, and computing, at time t, the current target exposure ($e_t$) of the fund to the underlying risky asset, based on the exposure function (e(s)), the price ($S_t$) of the underlying risky asset at time t and the average reference price ($K_t$) of the underlying risky asset.

* * * * *